3,042,689
16-HYDROCARBON SUBSTITUTED 16,17-DIHYDROXYESTREN-3-ONES, THEIR ESTERS AND ETHERS, AND INTERMEDIATES FOR THEIR PRODUCTION
David A. Tyner, Glenview, Ill., assignor to G. D. Searle & Co., Chicago, Ill., a corporation of Delaware
No Drawing. Filed Nov. 21, 1960, Ser. No. 70,382
17 Claims. (Cl. 260—397.4)

The present invention relates to a new group of progestational agents and more particularly to 16-hydrocarbon substituted 16, 17-dihydroxyestren-3-ones, their esters and ethers, and to intermediates for their production. These compounds can be represented by the general structural formula

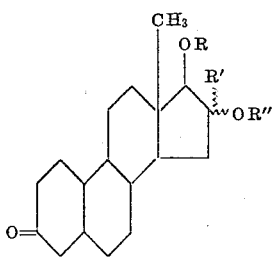

wherein R is a member of the class consisting of hydrogen, lower alkyl, and lower alkanoyl; R' is a member of the class consisting of lower alkyl, lower alkenyl, and lower alkynyl; wherein "R" is preferably hydrogen, but can also be a lower alkanoyl; and wherein there is a double bond solely in one of the positions 4(5) and 5(10). The alkyl, alkenyl, and alkynyl radicals can be those of up to 8 carbon atoms and include methyl, ethyl, and straight- or branched-chain propyl, butyl, amyl, hexyl, heptyl, octyl, vinyl, allyl, methallyl, crotyl, pentenyl, hexenyl, heptenyl, octenyl, ethylnyl, propynyl, butynyl, pentylnyl, hexynyl, heptynyl, and octynyl.

The lower alkanoyl radicals are derived from alkanoic acids of less than 9 carbon atoms.

The compounds of this invention are valuable progestational agents. They are particularly useful in menstrual disorders. These compounds have a consistent action in developing and maintaining the endometrium and produce prompt withdrawal bleeding. They are effective in a low dose and have the advantage over other progesterone-like agents in that they produce no appreciable side-effects in effective dosages.

The 16-alkyl compounds of this invention are conveniently prepared by using as a starting material a 3-alkoxy-16-alkyl-1,3,5(10)-estratriene - 16,17 - diol or the corresponding 17-alkoxy analogs. These compounds are subjected to a Birch-type reduction, typically with lithium and ammonia, to yield the 3-alkoxy-16-alkyl-2,5(10)-estradiene-16,17-diols or the corresponding 17-ethers. On mild acid treatment of these dienes there is obtained 16-alkyl-16,17-dihydroxy - 5(10) - estren-3-one or the 17-ether thereof. It is not necessary to interrupt the reaction at this stage. It is possible to cause isomerization of this 5(10)-estrene to the 4-estrene isomer by continuing the action of acid.

The 16-alkenyl and alkynyl compounds are prepared by reacting a 3-alkoxy - 17β(2 - pyranyloxy) - 2,5(10)-estradien-16-one with an organometallic reagent, such as alkenyl or alkynyl magnesium halide or an alkenyl or alkynyl lithium. Hydrolysis of the enol ether at position 3 and the pyranyl ether at position 17 is then achieved by treatment with an acid as detailed above.

An alternative procedure for the preparation of the 16-alkyl compounds comprises the hydrogenation of the corresponding 16-alkenyl derivatives, typically in the presence of a noble metal catalyst such as palladium-on-charcoal or palladium-on-calcium carbonate. The reaction is conveniently conducted at room temperature and atmospheric pressures. The 16-alkenyl derivatives can obviously be prepared from the corresponding 16-alkynyl analogs and isolation of the alkenyl compounds in the process is not essential. The 5(10)-estrenes, and the 16-alkenyl and alkynyl derivatives are themselves progestational agents, in addition to being valuable intermediates. The 16,17-diacylates are prepared by treating a 16-substituted 16,17-dihydroxy-4-estren-3-one with, for example, isopropenyl acetate to form the corresponding 3-acetoxy-3,5-estradiene derivative; this is hydrolyzed with dilute base or acid to yield the 4-estren-3-one derivative.

The application is a continuation-in-part of copending application Serial No. 854,606, filed November 23, 1959, now abandoned.

The compounds of this invention and the methods for their manufacture will become more fully apparent from a consideration of the following examples. In these examples quantities are given in parts by weight and temperature in degrees centigrade (° C.).

Example 1

Under constant agitation a solution of 2 parts of 3-methoxy-16α - methyl - 1,3,5(10) - estratrien - 16β,17β-diol in 105 parts of ether is first diluted by gradual addition with 175 parts of liquid ammonia and then treated with 2 parts of finely cut lithium wire. After stirring for 20 minutes, 30 parts of a 1:1 mixture of ethanol and ether is added in the course of 20 minutes. The ammonia is then permitted to evaporate after which water and ether are added to the mixture. The ether phase is separated, washed successively with water and diluted sodium hydroxide, water and saturated sodium chloride solution, dried over sodium sulfate, filtered and stripped to dryness. The 3-methoxy-16α-methyl - 2,5(10) - estradiene-16β,17β-diol thus obtained melts at about 178–190° C. on crystallization from benzene containing a trace of pyridine. Infrared maxima are observed at 2.98, 5.91, 6.03, 8.88, 9.35, 9.91 and 12.6 microns. The compound has the structural formula

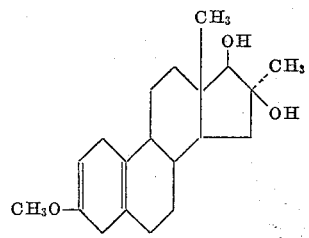

Example 2

A solution of 1 part of 3-methoxy-16α-methyl-2,5(10)-estradien-16β,17β-diol in 36 parts of a 1% solution of acetic acid in ethanol is heated at reflux temperature for 5 minutes after which hot water is added to turbidity. The mixture is then chilled to yield 16α-methyl-16β,17β-dihydroxy-5(10)-estren-3-one melting at about 132–140° C. Infrared maxima are observed at 2.95, 5.83, 8.37, 8.75, 9.35, 10.4, and 10.6 microns.

Example 3

A mixture of 1 part of 3-methoxy-16α-methyl-2,5(10)-estradien-16β,17β-diol, 5 parts of ethanol, 0.24 part of concentrated hydrochloric acid and 1 part of water is heated at reflux for 3 minutes. Then water is added to turbidity and the mixture is chilled. The resulting precipitate is recrystallized from a mixture of acetone and cyclohexane to yield 16α-methyl-16β,17β-dihydroxy-4-estren-3-one in long needles melting at about 175–179°

C. The compound shows an absorption maximum in the ultraviolet at 240 millimicrons with an extinction coefficient of about 17,500. The compound has the structural formula

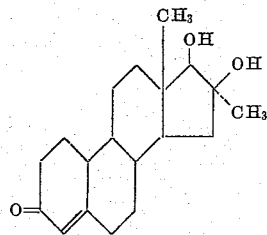

The same compound can be obtained by substituting 1 part of 16α-methyl-16β,17β-dihydroxy-5(10)-estren-3-one in the procedure of the first paragraph.

*Example 4*

By substituting 3-methoxy-16β-methyl-1,3,5(10)-estratriene-16α,17β-diol in the procedures of Examples 1, 2, and 3 there are obtained successively 3-methoxy-16β-methyl-2,5(10)-estradiene-16α,17β-diol, 16β-methyl-16α,17β-dihydroxy-5(10)-estren-3-one, and 16β-methyl-16α,17β-dihydroxy-4-estren-3-one. The latter is obtained as an oil. It has the structural formula

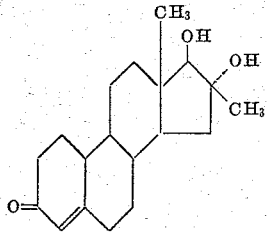

The ultraviolet absorption spectrum shows a maximum at 240 millimicrons with a molecular extinction coefficient of about 17,000. Infrared maxima are observed at 2.83, 2.92, 5.98, 6.20, 8.80, and 9.35 microns.

*Example 5*

To a solution of 5 parts of 3-methoxy-17β-hydroxy-1,3,5(10)-estratrien-16-one in 22 parts of benzene there is added in the course of 3–5 minutes a solution of allyl magnesium bromide prepared from 18.4 parts of magnesium, 7.6 parts of allyl bromide and 35 parts of anhydrous ether. The resulting mixture is heated at reflux temperatures for 12 hours, cooled to about 50° C. and then treated with 3 parts of acetone and 9 parts of benzene. This mixture is cooled in an ice bath while 10 parts of a saturated ammonium chloride solution are added portionwise. The mixture is extracted with chloroform and the extract is dried over sodium sulfate, filtered, and taken to dryness under vacuum. The residue becomes crystalline. It is dissolved in methanol, decolorized in charcoal and treated with water to induce crystallization. Recrystallized from acetone and petroleum ether and then from cyclohexane, the 3-methoxy-16α-allyl-1,3,5(10)-estratriene-16β,17β-diol melts at about 124–130° C.

*Example 6*

A solution of 1.1 parts of 3-methoxy-16α-allyl-1,3,5(10)-estratriene-16β,17β-diol in 50 parts of pure dioxane is hydrogenated in the presence of 0.5 part of a 5% palladium-on-charcoal catalyst. When the uptake of hydrogen has ceased the catalyst is removed by filtration and the filtrate is stripped to dryness under vacuum. The residual colorless oil is applied to a chromatography column. The column is developed with benzene and benzene solutions containing increasing concentrations of ethyl acetate. Elution with a 5% solution of ethyl acetate in benzene and concentration of the eluate yields a crystalline product which on crystallization from methylcyclohexane forms the hydrate of 3-methoxy-16α-propyl-1,3,5(10)-estratriene-16β,17β-diol which melts at 76–80° C., resolidifies and then melts again at about 100–103° C.

*Example 7*

Under anhydrous conditions 0.88 part of liquid ammonia are poured slowly to a stirred solution of 2.25 parts of 3-methoxy-16α-propyl-1,3,5(10)-estratrien-16β,17β-diol in 45 parts of freshly distilled tetrahydrofuran and 40 parts of tertiary butanol. Then 1 part of lithium wire is added rapidly in small pieces. The blue solution becomes colorless after about 150 minutes. Then 4.5 parts of methanol are slowly added and the ammonia is evaporated. Water and ether are added and the ether phase is separated, washed successively with water, dilute sodium hydroxide, water and then with saturated sodium chloride solution. After drying the solution is taken to dryness under vacuum. On crystallization from cyclohexane containing a small amount of pyridine, the 3-methoxy-16α-propyl-2,5(10)-estradien-16β,17β-diol melts at about 132–142° C. The infrared absorption shows maxima at 3.0, 5.89, 6.00, 8.17, 8.48, 8.83, 9.1, and 9.33 microns.

*Example 8*

A mixture of 1 part of 3-methoxy-16α-propyl-2,5(10)-estradiene-16β,17β-diol, 20 parts of methanol and 4 parts of acetic acid is heated under reflux for 5 minutes. Water is added and the mixture is refrigerated for several hours. The precipitated product is collected on a filter and dried to yield 16α-propyl-16β,17β-dihydroxy-5(10)-estren-3-one. Infrared maxima are observed at 2.45, 5.83, 8.37, 9.35, and 10.5. The compound has the structural formula

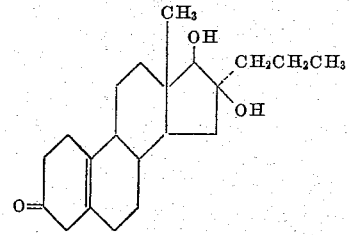

*Example 9*

A solution of 0.78 part of 3-methoxy-16α-propyl-2,5(10)-estradiene-16β,17β-diol in 10 parts of ethanol, 0.6 part of concentrated hydrochloric acid and 2 parts of water is heated and refluxed for 5 minutes. Then hot water is added to turbidity and the mixture is cooled and extracted with dichloromethane. This extract is washed with water and salt solution, dried over anhydrous sodium sulfate, filtered and taken to dryness. The residual glass is applied in benzene solution to a silica chromatography column which is developed with benzene solutions containing increasing concentrations of ethyl acetate. Elution with a 20% ethyl acetate solution yields oily 16α-propyl-16β,17β-dihydroxy-4-estren-3-one. The compound shows an absorption maximum in the ultraviolet region at 240 millimicrons and has an extinction coefficient of about 16,900. A chloroform solution of the compound shows infrared maxima at 2.69, 2.73, 2.81, 5.98, 6.16, 8.80, and 9.32 microns. The compound has the formula

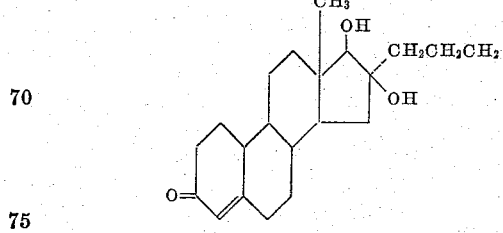

Example 10

To a Grignard solution of 11.3 parts of ethylmagnesium bromide in ethyl ether is added portionwise 10.4 parts of 1-octyne in 35 parts of dry ether. After the addition is completed, the solution is refluxed for 2 hours and then added portionwise to a solution of 5 parts of 3-methoxy-17β-hydroxy-1,3,5(10)-estratrien-16-one in 45 parts of benzene. The mixture is then refluxed for 6 hours. To this mixture are added 4.8 parts of acetone in 16 parts of benzene at a temperature of about 60° C. After chilling, the mixture is hydrolyzed with a saturated aqueous ammonium chloride solution. The layers are separated and the organic layer is evaporated. The oily residue is recrystallized twice from cyclohexane to yield 3-methoxy - 16α - (1 - octynyl) - 1,3,5(10)-estratriene-16β,17β-diol melting at about 130–132° C.

Example 11

A mixture of 1.05 parts of 3-methoxy-16α-(1-octynyl)-1,3,5(10)-estratriene-16β,17β-diol, 50 parts of dioxane, and 0.5 part of a 5% palladium-on-charcoal catalyst is hydrogenated at room temperature, filtered, and then evaporated. The oily residue is chromatographed on a column containing silica gel and developed by using solutions containing increasing concentrations of ethyl acetate in benzene. The eluate obtained by a 2% ethyl acetate in benzene mixture melts at about 59–78° C. The compound, 3-methoxy - 16α - octyl-1,3,5(10)-estratriene-16β,17β-diol, has the structural formula

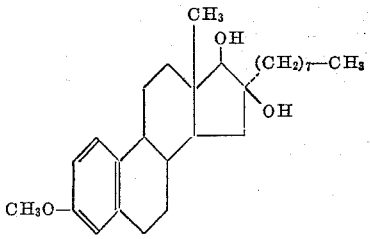

Example 12

To a solution of 3-methoxy-16α-octyl-1,3,5(10)-estratriene-16β,17β-diol in 42 parts of tetrahydrofuran and 40 parts of tertiary butanol is added 88 parts of freshly distilled liquid ammonia and one part of lithium wire. After stirring the mixture for 3 hours, 45 parts of methanol are added slowly. The ammonia is then evaporated. The solution is then partitioned between water and ether and the layers separated. The ether layer is washed successively with water, sodium hydroxide, water, and then a saturated sodium chloride solution. After drying over sodium sulfate, the solution is evaporated. The oily residue is triturated with hot pentane to initiate crystallization. The precipitate is collected on a filter and dried to yield 3-methoxy-16α-octyl - 2,5(10)-estradiene - 16β,17β-diol melting at 82–87° C. The compound exhibits infrared maxima at 2.88, 2.99, 5.88, 5.99, 8.15, 8.48, 8.77, 9.10, 9.77, 9.90, and 12.5 microns.

Example 13

A mixture of 1.1 parts of 3-methoxy-16α-octyl-2,5(10)-estradiene-16β,17β-diol, 8 parts of methanol, 0.7 part of concentrated hydrochloric acid, and 0.4 part of water is stirred at room temperature for 2 hours. The oil formed is extracted with dichloromethane. The extract is washed with water, dried, and evaporated. The oily residue is chromatographed on a column of silica gel. The column is developed by using increasing amounts of ethyl acetate in benzene. The eluate obtained by using a 20% ethyl acetate in benzene solution is recrystallized from a mixture of acetone and hexane to yield 16β,17β-dihydroxy-16α-octyl-4-estren-3-one melting at about 91–94.5° C. The compound has an absorption maximum in the ultraviolet at 240 millimicrons with an extinction coefficient of 18,100. Infrared maxima are observed at 2.80, 2.99, 6.02, 6.18, 7.79, 8.25, 8.44, 8.60, 9.18, 9.37, 9.47, 9.80, 10.28, 10.98, 11.32, 11.50, and 11.93 microns.

Example 14

A solution of 0.5 part of 16α-propyl-16β,17β-dihydroxy-4-estren-3-one in 1 part of acetic anhydride and 1 part of pyridine is allowed to stand at room temperature for 12 hours. To this solution is added water and ice. The solid precipitate is collected on a filter and then recrystallized from ethanol to give 16α-propyl-16β-hydroxy-17β-acetoxy-4-estren-3-one melting at about 192–195° C.

By substituting propionic anhydride for acetic anhydride in the above procedure, 16α-propyl-16β-hydroxy-17β-propionoxy-4-estren-3-one is obtained. The compound has the structural formula

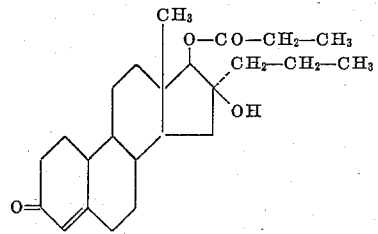

Infrared maxima are observed at about 2.85, 5.75, 6 and 8.1 microns. The ultraviolet absorption spectrum shows a maximum at about 240 millimicrons with a molecular extinction coefficient of about 17,700.

Example 15

A solution of 1 part of 16α-ethynyl-16β,17β-dihydroxy-4-estren-3-one in 3 parts of pyridine and 3 parts of acetic anhydride is allowed to stand at room temperature for 15 hours. The solution is then diluted with water and the precipitate is collected by filtration. Upon recrystallization from a mixture of dichloromethane and benzene there is obtained 16α-ethynyl-16β-hydroxy-17β-acetoxy-4-estren-3-one melting at about 252–254° C.

Substitution of an equimolar amount of 16α-vinyl-16β,17β-dihydroxy-4-estren-3-one for the 16α-ethynyl-16β,17β-dihydroxy-4-estren-3-one in the preceding paragraph yields 16α-vinyl-16β-hydroxy-17β-acetoxy-4-estren-3-one melting at about 195–197° C.

Substitution of an equimolar amount of 16α-(1-octynyl)-16β,17β-dihydroxy-4-estren-3-one for the 16α-ethynyl-16β,17β-dihydroxy-4-estren-3-one in the first paragraph of this example yields 16α(1-octynyl)-16β-hydroxy-17β-acetoxy-4-estren-3-one melting at about 129–131° C.

Substitution of an equimolar amount of 16α-(2-methallyl)-16β,17β-dihydroxy-4-estren-3-one for the 16α-ethynyl-16β,17β-dihydroxy-4-estren-3-one in the first paragraph of this example yields 16α-(2-methallyl)-16β-hydroxy-17β-acetoxy-4-estren-3-one melting at about 175–177° C.

Example 16

To a stirred solution of 1.04 parts of 3-methoxy-16α-propyl-1,3,5(10)-estratriene-16β,17β-diol in 18 parts of dry benzene under a nitrogen atmosphere at 10° C. are added .35 part of potassium tertiary butoxide in 14 parts of toluene. After 5 minutes, 4.5 parts of methyl iodide are added. The mixture is allowed to stand at room temperature for 1 hour and then shaken with water. The organic layer is separated, washed until neutral, dried, and then evaporated to yield 3,17β-dimethoxy-16α-propyl-1,3,5(10)-estratrien-16β-ol as an oily solid.

Under anhydrous conditions a solution of 8.7 parts of 3,17β-dimethoxy-16α-propyl-1,3,5(10)-estratrien-16β-ol in 450 parts of dry ether is diluted by gradual addition with 860 parts of ammonia under stirring. Then 8.7 parts of lithium wire are added in the course of 20 minutes while stirring is continued. Next, 130 parts of a 50% solution of methanol and ether is added in the course of 20 minutes. The ammonia is then permitted to evaporate and the ether solution is separated and washed successively with water, 1 N sodium hydroxide, water and saturated sodium chloride solution. The solution is then dried over sodium sulfate, filtered and taken to dryness. On recrystallization from benzene containing a trace of pyridine there is obtained 3,17β-dimethoxy-16α-propyl-2,5-(10)-estradien-16β-ol. The infrared spectrum shows maxima at about 3.0, 5.90, 6.02, 8.86, and 9.33 microns.

A solution of 1 part of 3,17β-dimethoxy-16α-propyl-2,5(10)-estradien-16β-ol in 32 parts of 1% solution of acetic acid in ethanol is heated at reflux for 5 minutes. Then hot water is added to incipient turbidity. The mixture is then rapidly chilled and the resultant precipitate is collected on a filter and washed with water. On recrystallization from acetone and cyclohexane there is obtained 16α - propyl - 16β-hydroxy - 17β-methoxy - 5(10)-estren-3-one.

A mixture of 1 part of 16α-propyl-16β-hydroxy-17β-methoxy-5(10)-estren-3-one, 9 parts of ethanol, 2.2 parts of water and 0.7 part of concentrated hydrochloric acid is heated at reflux for 3 minutes after which hot water is added to the point of incipient turbidity. After cooling the precipitate is collected on a filter, washed with water and recrystallized twice from a mixture of acetone and cyclohexane to yield the oily 16α-propyl-16β-hydroxy-17β-methoxy-4-estren-3-one. The ultraviolet spectrum shows a maximum at 240 millimicrons with a molecular extinction coefficient of about 17,000.

*Example 17*

By substituing 5.5 parts of ethyl iodide for methyl iodide in the first paragraph of Example 16 and otherwise following the procedure outlined in that example, 3-methoxy-16α-propyl-17β-ethoxy-1,3,5(10)-estratrien-16β-ol, 3-methoxy-16α-propyl-17β-ethoxy - 2,5(10)-estradien-16β-ol, 16α-propyl-16β-hydroxy-17β-ethoxy-5(10)-estren-3-one, and 16α-propyl-16β-hydroxy-17β-ethoxy-4-estren-3-one are obtained. The latter has the structural formula

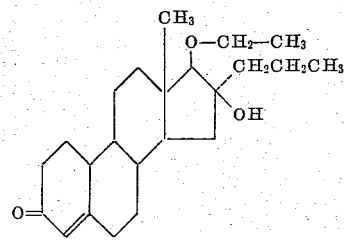

Infrared maxima are observed at 2.73, 5.98, 6.16, 8.80, and 9.32 microns.

*Example 18*

A solution of 71.5 parts of 3-methoxy-17β-(2-pyranyloxy)-1,3,5(10)-estratrien-16-one (U.S. Patent 3,002,008, Example 1) in 314 parts of 2-propanol maintained at 60° C. is treated with a solution of 5 parts of sodium borohydride in 50 parts of water for 30 minutes. The solution is heated on the steam bath at 70° C. and is diluted with hot water until crystallization begins. After cooling to room temperature, the crude product is collected by filtration. This is 3-methoxy-17β-(2-pyranyloxy)-1,3,5-(10)-estratrien-16β-ol melting at about 106–120° C. This compound is suitable for the next step without further recrystallization.

A solution of 40 parts of 3-methoxy-17β-(2-pyranyloxy)-1,3,5(10)-estratrien-16β-ol in 280 parts of tetrahydrofuran is added to a stirred solution of 316 parts of tertiary butanol in 1300 parts of redistilled ammonia and is then treated portionwise with 27 parts of sodium. After about 2 hours, sufficient methanol is added to decompose the excess sodium and the ammonia is evaporated. The organic solvents are removed by means of a short steam distillation, while maintaining a minimum volume of 1000 parts in the aqueous phase. Upon cooling the product solidifies into a glass. The alkaline aqueous phase is decanted and the product is taken up in toluene. The solution is thoroughly washed with water, dried over sodium sulfate, and evaporated to dryness. The residue is recrystallized from methanol to give 3-methoxy-17β-(2-pyranyloxy) - 2,5(10)-estradien - 16β-ol melting at about 127–133° C.

A solution of 40 parts of 3-methoxy-17β-(2-pyranyloxy)-2,5(10)-estradien-16β-ol in 190 parts of freshly distilled cyclohexanone and 522 parts of toluene is dried by distilling off about 87 parts of toluene under a nitrogen atmosphere and then adding about 200 parts of a 1 M solution of aluminum tertiary butoxide in toluene. After heating at reflux for about 15 minutes, the reaction mixture is cooled and extracted several times with saturated sodium potassium tartrate solution. The extracts are combined and steam distilled. The oily residue which is 3 - methoxy-17β-(2-pyranyloxy)-2,5(10)-estradien-16-one is taken up in benzene and dried over sodium sulfate. This solution is suitable for further reaction without crystallization or further purification.

About 100 parts of the dry benzene solution of 3-methoxy-17β-(2-pyranyloxy)-2,5(10)-estradien - 16 - one is added to a stirred 5° C. solution of potassium acetylide. The potassium acetylide is formed by mixing 28 parts of potassium and 400 parts of tertiary butanol and saturating the solution with acetylene. After about 4½ to 5 hours under an acetylene atmosphere at 5° C., the reaction mixture is diluted with water and extracted several times with ether. The ether extracts are combined, dried and distilled to dryness to give 3-methoxy-16α-ethynyl-17β-(2-pyranyloxy)-2,5,(10)-estradien-16β-ol as a glass.

A refluxing solution of 10 parts of 3-methoxy-16α-ethynyl-17β(2-pyranyloxy)2,5(10)-estradien - 16β-ol in 160 parts of methanol is treated with a solution of 0.5 part of oxalic acid in 36 parts of water. Refluxing is continued for 5 minutes, after which the solution is placed in an ice bath and treated with a solution of 0.7 part of sodium bicarbonate in 20 parts of water. The solution is diluted with water and extracted with ether. The ether solution is washed until neutral and evaporated to a glass. Upon recrystallization from acetonitrile there is obtained 16α - ethynyl-16β,17β-dihydroxy-5(10)-estren-3-one melting at about 177–193° C. The infrared spectra shows a peak at 5.80 microns, which indicates a non-conjugated 6-membered ring ketone.

A solution of 18.7 parts of 3-methoxy-16α-ethynyl-17β-(2-pyranyloxy)-2,5(10)-estradien-16β-ol in 148 parts of methanol is treated with 20 parts of an 0.5 N hydrochloric acid solution and allowed to stand at room temperature for about 4 hours. After dilution with twice its volume of water, the solution is extracted with benzene. The benzene extracts are combined, washed successively with 1% sodium hydroxide and water, dried over sodium sulfate, and evaporated to a low volume. Upon cooling some of the desired product precipitates and is collected by filtration. Upon recrystallization from a mixture of dichloromethane and benzene there is obtained 16α-ethynyl-16β,17β-dihydroxy-4-estren-3-one melting at about 193–195° C. Additional material can be obtained from the mother liquors by chromatography on a silica gel column and elution with a 25% solution of ethyl acetate in benzene.

The same compound can be obtained by substituting 18.7 parts of 3-methoxy-16α-ethynyl-17β-(2-pyranyloxy)-5(10)-estren-16β-ol in the procedure of the foregoing paragraph.

*Example 19*

To a stirred and refluxing solution of 1-octyne magnesium bromide is added about 50 parts of the dry benzene solution containing 3-methoxy-17β-(2-pyranyloxy)-2,5(10)-estradien-16-one. After 6 hours the mixture is cooled and extracted with ammonium chloride solution and saturated sodium chloride solution. The extracts are combined and dried over sodium sulfate followed by evaporation of the solvents, to give 3-methoxy-16α-(1-octynyl)-17β-(2-pyranyloxy)-3,5(10)-estradien-16β-ol as an oil.

A solution of the above oil in 28.4 parts of methanol and 4 parts of 5 N hydrochloride acid is kept at room temperature for about 3½ hours. The solution is then diluted with water and extracted several times with ether. The ether extracts are combined, and washed successively with 1% sodium hydroxide solution, water, and sodium chloride solution. The solvent is removed by evaporation and the residue is applied to a chromatography column containing silica gel. Upon elution with a 25% solution of ethyl acetate in benzene there is obtained 16α-(1-octynyl)-16β,17β-dihydroxy-4-estren-3-one as an oil.

*Example 20*

A suspension of methallyl magnesium chloride in ether is prepared from 2.5 parts of magnesium in 107 parts of ether by adding 10 parts of methallyl chloride slowly to the refluxing system. After 2 hours a solution of 5 parts of 3-methoxy-17β-(2-pyranyloxy)-2,5(10)-estradien-16-one in 35.6 parts of ether is added and the mixture is refluxed for about 15 hours. Then saturated ammonium chloride solution is added and the ether layer is separated. The ether layer is washed with sodium chloride solution, dried over sodium sulfate, and evaporated to dryness. Upon trituration of the resulting oil with methanol there is obtained a solid which, upon recrystallization from a mixture of dichloromethane and ethanol, yields 3-methoxy-16α-(2-methallyl)-17β-(2-pyranyloxy)-2,5(10)-estradien-16β-ol melting at about 152–154° C.

To a suspension of 1 part of 3-methoxy-16α-(2-methallyl)-17β-(2-pyranyloxy)-2,5(10)-estradien-16β-ol in 14.2 parts of methanol is added 2 parts of 5 N hydrochloric acid. The solution is kept at room temperature for about 4 hours and then diluted with water and cooled. The precipitate is collected by filtration and upon recrystallization from a mixture of benzene and cyclohexane there is obtained 16α-(2-methallyl)-16β,17β-dihydroxy-4-estren-3-one melting at about 120–122° C.

*Example 21*

A solution of 1 part of 16α-ethynyl-16β,17β-dihydroxy-4-estren-3-one in 19.6 parts of pyridine is reduced at room temperature and atmospheric pressure over a 5% palladium-on-calcium carbonate catalyst. The catalyst is removed by filtration, water is added, and the solution is extracted with benzene. The benzene extracts are combined and washed with dilute acid and water. After drying of the solution and evaporation of the solvent there is obtained 16α-vinyl-16β,17β-dihydroxy-4-estren-3-one as an oil.

*Example 22*

A solution of 5 parts of 16α-propyl-16β,17β-dihydroxy-4-estrene-3-one, 0.5 part of p-toluenesulfonic acid, and 88 parts of isopropenyl acetate is refluxed under a nitrogen atmosphere for 4½ hours. During the period about 25 parts of distillate are removed. After cooling to about 20° C., 0.25 part of anhydrous sodium acetate are added and the solvent is vacuum distilled. Upon crystallization of the residue from methanol, there is obtained 16α-propyl-3,16β,17β-triacetoxy-3,5-estradiene melting at about 109–116° C.

A solution of 1 part of 16α-propyl-3,16β,17β-triacetoxy-3,5-estradiene in 40 parts of methanol is treated with a solution of 0.3 part of potassium carbonate in 5 parts of water. After 15 minutes, the solution is diluted with water and extracted with ether. The ether extract is washed with water, dried over sodium sulfate and evaporated to dryness to yield 16α-propyl-16β,17β-diacetoxy-4-estren-3-one as a pale yellow glass, which on crystallization from aqueous methanol, melts at about 64–67° C.

What is claimed is:

1. A compound of the formula

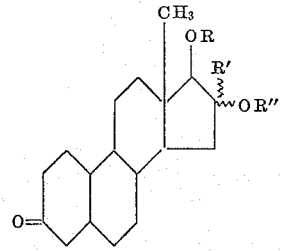

wherein R is a member of the class consisting of hydrogen, lower alkyl and lower alkanoyl; wherein R' is a member of the class consisting of lower alkyl, lower alkenyl and lower alkynyl; wherein R" is a member of the class consisting of hydrogen and lower alkanoyl; and wherein there is a double bond in one of the positions selected from the group consisting of position 4(5) and position 5(10).

2. 16α - (lower alkyl) - 16β,17β - dihydroxy-4-estren-3-one.
3. 16α-methyl-16β,17β-dihydroxy-4-estren-3-one.
4. 16α-propyl-16β,17β-dihydroxy-4-estren-3-one.
5. 16α-octyl-16β,17β-dihydroxy-4-estren-3-one.
6. 16α - (lower alkyl) - 16β,17β - dihydroxy - 5(10)-estren-3-one.
7. 16α - methyl - 16β,17β - dihydroxy - 5(10) - estren-3-one.
8. 16α - propyl - 16β,17β - dihydroxy - 5(10) - estren-3-one.
9. 16α - (lower alkynyl) - 16β,17β - dihydroxy - 4-estren-3-one.
10. 16α-ethynyl-16β,17β-dihydroxy-4-estren-3-one.
11. 16α - (lower alkenyl)-16β,17β-dihydroxy-4-estren-3-one.
12. 16α-vinyl-16β,17β-dihydroxy-4-estren-3-one.
13. A compound of the structural formula

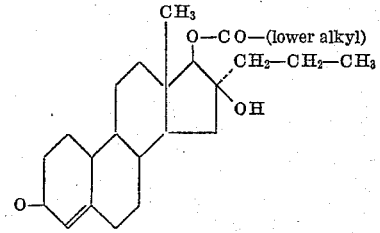

14. 16α - propyl - 16β-hydroxy-17β-acetoxy-4-estren-3-one.
15. 3 - methoxy - 16α - (lower alkyl) - 2,5(10)-estradiene-16β,17β-diol.
16. 3 - methoxy - 16α - methyl - 2,5(10) - estradiene-16β,17β-diol.
17. 3 - methoxy - 16α - propyl - 2,5(10) - estradiene-16β,17β-diol.

References Cited in the file of this patent

FOREIGN PATENTS 804,789    Great Britain _____ Nov. 26, 1958

OTHER REFERENCES

Colton et al.: J.A.C.S., vol. 79 (Mar. 5, 1957), pp. 1123–1127.

Drill et al.: "Recent Progress in Hormone Research," vol. XIV, New York: Academic Press, Inc., 1958, pp. 29–76 (page 61 necessary).

UNITED STATES PATENT OFFICE
CERTIFICATE OF CORRECTION

Patent No. 3,042,689　　　　　　　　　　　　　　July 3, 1962

David A. Tyner

It is hereby certified that error appears in the above numbered patent requiring correction and that the said Letters Patent should read as corrected below.

Column 1, line 31, for ' "R" ' read -- R" --; line 38, for "ethylnyl" read -- ethynyl --; line 39, for "pentylnyl" read -- pentynyl --; column 5, line 27, for "59-78° C." read -- 58-78° C. --.

Signed and sealed this 25th day of June 1963.

(SEAL)
Attest:

ERNEST W. SWIDER
Attesting Officer

DAVID L. LADD
Commissioner of Patents